W. M. DWIGHT.
PLANING AND MATCHING MACHINE.
No. 10,736. Reissued June 15, 1886.
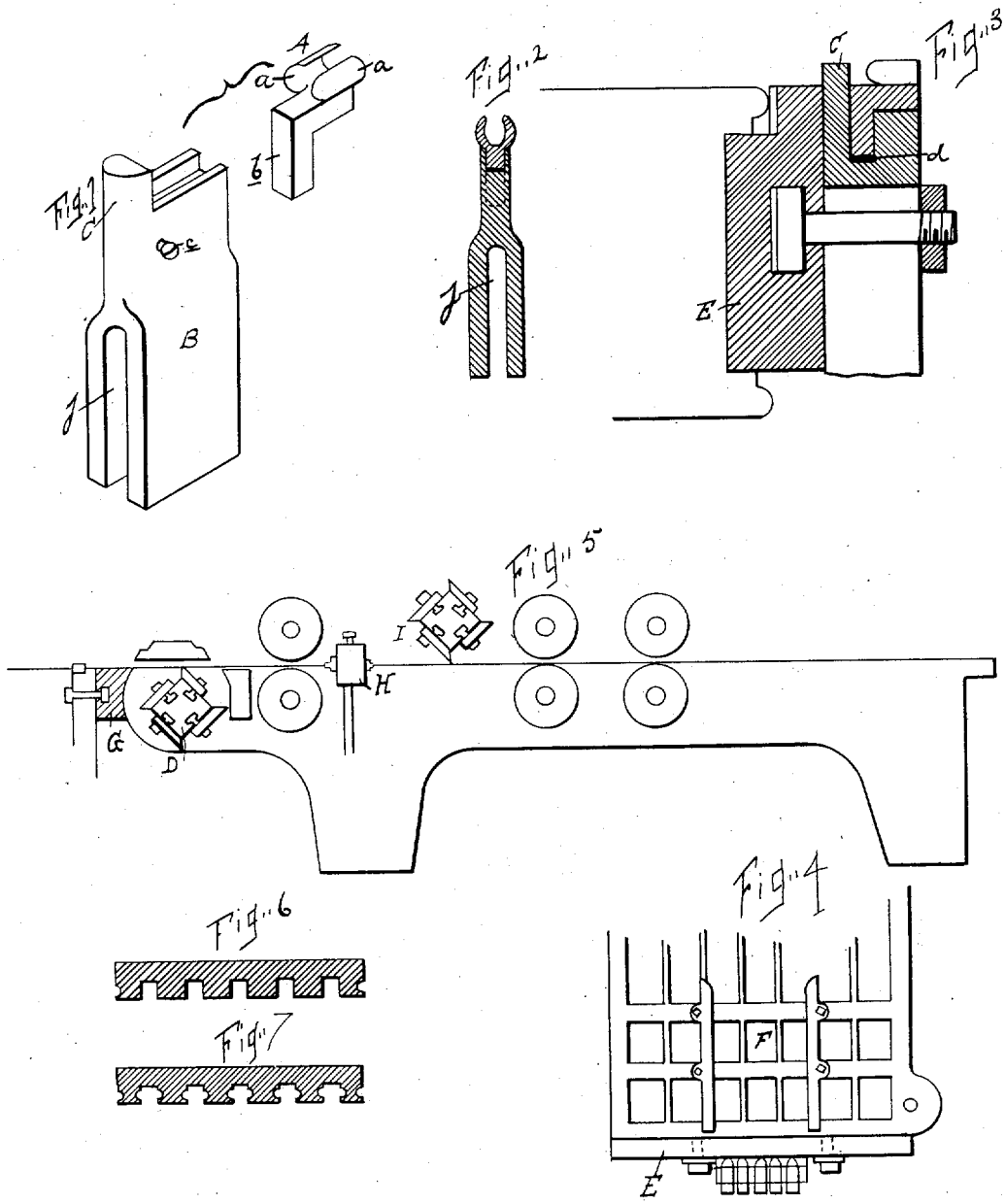
Witnesses
Henry B. Lothrop
Summer Collins
Inventor
William M. Dwight
by Geo. H. Lothrop
Atty.
N. PETERS, Photo-Lithographer, Washington, D. C.

UNITED STATES PATENT OFFICE.

WILLIAM M. DWIGHT, OF DETROIT, MICHIGAN.

PLANING AND MATCHING MACHINE.

SPECIFICATION forming part of Reissued Letters Patent No. 10,736, dated June 15, 1886.

Original No. 329,824, dated November 3, 1885. Application for reissue filed March 20, 1886. Serial No. 196,019.

*To all whom it may concern:*

Be it known that I, WILLIAM M. DWIGHT, of Detroit, in the county of Wayne and State of Michigan, have invented new and useful Improvements in Planing-Machines; and I do hereby declare that the following is a full, clear, and exact description thereof, reference being had to the accompanying drawings, which form a part of this specification.

This invention relates to a new and useful improvement to adapt planing-machines to undercut grooves in lumber; and the invention consists in the peculiar construction and arrangement of undercutting-knives adapted by operating in connection with rotary cutters to produce undercut grooves.

In the art of building it has been proposed to provide building-lumber—such as sheathing—upon one side with a series of undercut grooves, so as to adapt it to receive plastering; and it is the object of my invention to manufacture such building-lumber in the manner hereinafter described.

In the drawings which accompany this specification, Figure 1 is a perspective view of an undercutting-knife. Fig. 2 is a cross-section thereof. Fig. 3 is a vertical section thereof, showing it secured to a knife-head, which is in turn secured to the rear end of the bed of the planing-machine. Fig. 4 is a plan showing a series of undercutting-knives secured to the tail-board of a planing-machine. Fig. 5 is a vertical central section of an ordinary planing-machine arranged for manufacturing lumber with undercut mortises by the use of my undercutting-knives. Fig. 6 shows a cross-section of a board after it has passed the rotary cutter-head of the planing-machine. Fig. 7 shows a cross-section of the finished board.

A is a knife having two gouge-shaped cutting-blades, *a a*, parallel to each other. This knife I preferably secure removably to a stock, B, by providing the knife with a square shank, *b*, and securing it by means of a set-screw, *c*, in a corresponding recess, *d*, in the stock. The stock B is provided with the usual slot, *f*, for securing it by means of a bolt to a knife-head.

C is a rounding stud projecting on top of the stock B, in front of the cutting-edges of the knife. It may be either made in a separate piece from the stock and removably secured thereto or formed integral with it.

In practice, when it is desired to make lumber with undercut grooves, I provide the lower cylinder, D, of a suitable planing-machine with the proper knives to cut into the under side of the board a series of parallel grooves or mortises with straight sides, as shown in Fig. 6. Then for each groove I secure to the bed of the planing-machine an undercutting-knife of the kind described above, in such manner that its cutting-blades enter into the groove and cut away, while the board is traveling, a portion of the material upon the sides of the mortise, so as to make it an undercut groove, as shown in Fig. 7. These knives may be secured anywhere in the rear of the cylinder D. In Figs. 3 and 4 I show them adjustably secured, in the ordinary manner used for planer-knives, to a head, E, which latter is then bolted onto the tail-board F, either in front or rear thereof.

In Fig. 5 I show another way for securing the undercutting-knives to the bed of the planing-machine; and this consists in transforming the chip-breaker G in rear of the lower cylinder into a combined chip-breaker and knife-head, to the rear face of which the undercutting-knives are secured in the usual manner. As the chip-breakers are generally removably secured in position, the latter way of securing the undercutting-knives is in most planing-machines the preferable way, as these knives can then be easily removed when not wanted. It will be seen that the stud C on the undercutting-knives is in front of the cutting-blades, and it therefore enters the grooves made by the rotary cutters in advance of the cutting-blades, thus guiding them safely into the grooves at every fresh board, and also preventing the splitting off of the material to be removed by the undercutting-knives should the boards happen to be more or less cross-grained.

If the planing-machine is provided with the ordinary matcher-heads, H, suitable cutters may be secured in these matcher-heads to cut half a groove on the edges of the boards, as shown in Fig. 6. I preferably cut the grooves upon the under side of the board, as it allows me to use the upper cylinder, I, to reduce the boards to a common thickness. It is obvious, however, that the parts may be arranged to groove the upper side.

Any particular form of undercut grooves may be produced in the manner herein described by giving the undercutting-knives the proper form; but as my object in view is merely to provide a "clinch" for the plaster, I have chosen the simple form shown in the drawings, which gives a convenient form to the undercutting-knives; but I do not confine myself to any particular form of knife or groove.

Instead of using a cylinder with rotary cutters, as above described, the well-known substitute of a series of rotary saws on an arbor may be used for cutting the square groove, and instead of undercutting on both sides of the groove the undercutting may be done on one side only.

No claim is made herein to the specific construction of the cutter-head, as the same will be made the subject-matter of a separate application. Neither do I claim herein the sheathing-lath herein shown and described, as that also will be made the subject-matter of a separate application about to be filed by me.

What I claim as my invention is—

1. In a planing-machine, the combination of a series of rotary knives or rotary saws arranged to cut a series of grooves in a board, and of a series of stationary knives having knife-blades arranged in rear of said rotary knives and constructed to undercut these grooves, substantially as described.

2. In a planing-machine, the combination of the rotary cutter-head D, having a series of grooving-cutters, and of a series of stationary knives, one for each groove, arranged in the rear of said cutter-head, and having cutter-blades arranged to enter the grooves and undercut them, substantially as described.

3. In a planing-machine, the combination of the lower cylinder, D, having a series of grooving-cutters, of a series of stationary knives, A, having undercutting-blades *a*, and arranged in rear of said cylinder, and of the chip-breaker G, forming a knife-head, to which the knives A are secured, substantially as described.

4. In a planing-machine, the combination of the lower cylinder, D, having a series of grooving-cutters, and of a series of stationary knives, A, arranged in rear of said cylinder, and having undercutting-blades *a* and guides C, substantially as described.

5. In a planing-machine, the combination of the matcher-heads H, having suitable cutters for making half-grooves, the lower cylinder, D, arranged in the rear of said heads, and having a series of grooving-cutters, and of the undercutting-knives A, stationarily secured to the bed of the machine in rear of said cylinder, substantially as described.

6. In a planing-machine, the combination, with feeding mechanism adapted to feed a board through the machine, of an undercutting tool or knife, substantially as described secured in position and acting upon the sides of a groove formed in the under side of the board, substantially as and for the purposes described.

7. In a planing-machine, the combination of a rotary cutter adapted to cut a straight-sided groove in a board, and a stationary knife secured in rear of said cutter, and constructed to undercut said groove, substantially as shown and described.

WILLIAM M. DWIGHT.

Witnesses:
SUMNER COLLINS,
GEO. H. LOTHROP.